UNITED STATES PATENT OFFICE.

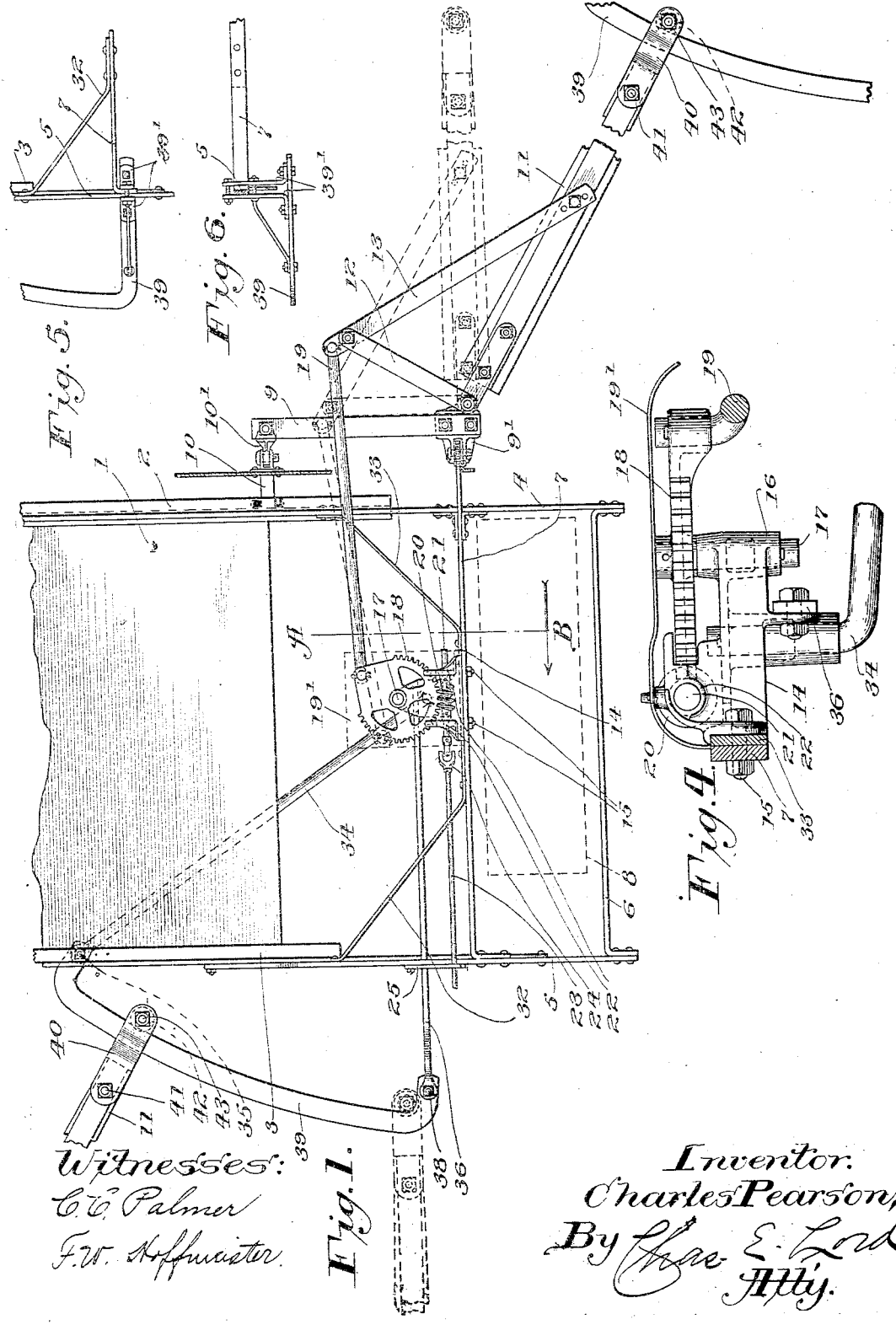

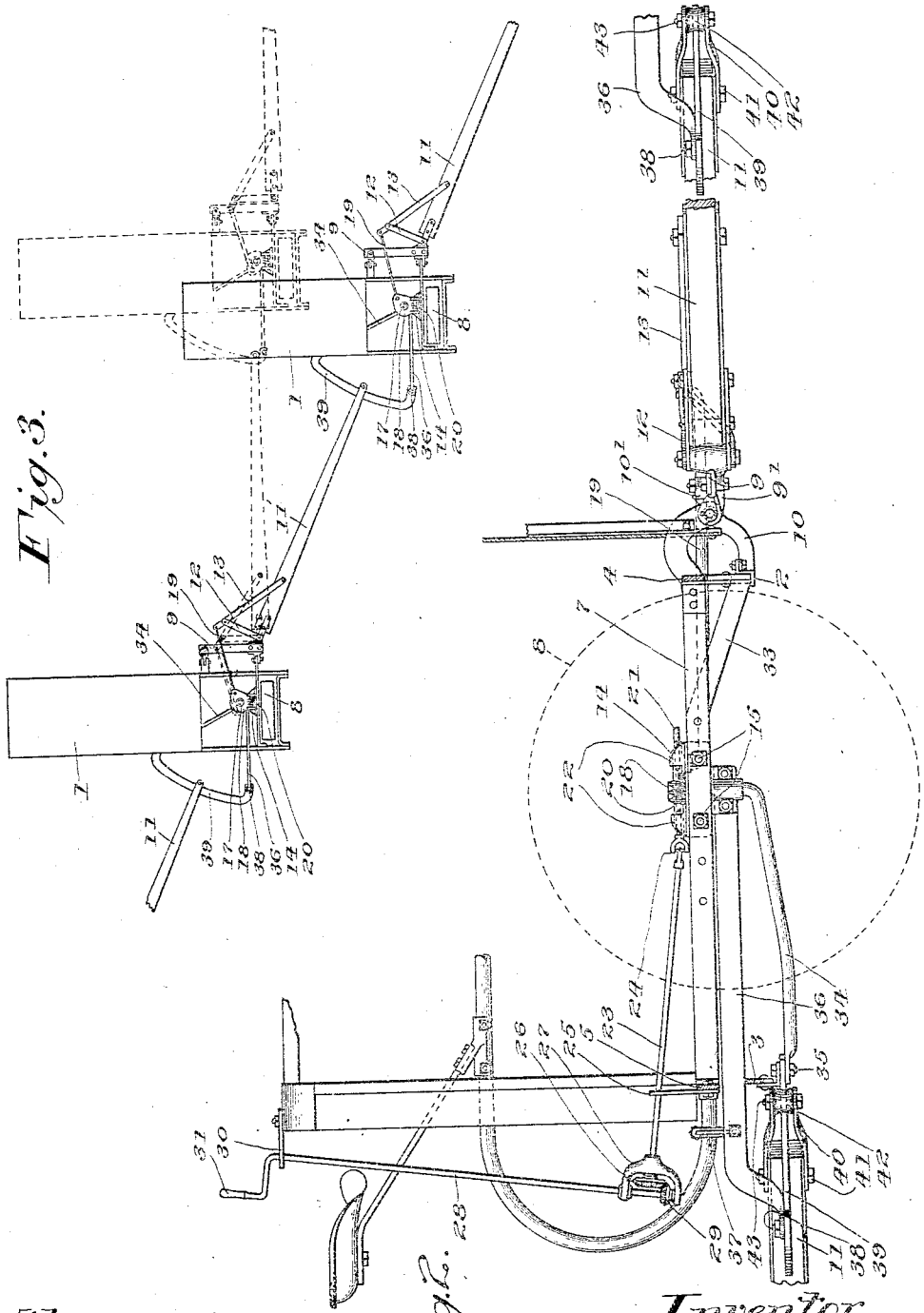

CHARLES PEARSON, OF CHICAGO, ILLINOIS, ASSIGNOR TO INTERNATIONAL HARVESTER COMPANY OF NEW JERSEY, A CORPORATION OF NEW JERSEY.

TRACTOR-BINDER HITCH.

1,159,987.   Specification of Letters Patent.   Patented Nov. 9, 1915.

Application filed May 1, 1913.  Serial No. 764,927.

*To all whom it may concern:*

Be it known that I, CHARLES PEARSON, a citizen of the United States, residing at Chicago, in the county of Cook and State of Illinois, have invented certain new and useful Improvements in Tractor - Binder Hitches, of which the following is a full, clear, and exact specification.

My invention relates to draft mechanism whereby a series of grain harvesters or other implements may be connected together in tandem relation and drawn forward by a single source of power, as a traction engine, to which the forward machine of the series is connected, and consists in providing improved draft connections between the different units and between the series and the source of power that may be manipulated by the operator upon the machine in an improved manner to control the line of advance of one machine independent of the others, whereby a greater or less width of swath may be cut by either unit of the series, or the machines may be controlled in a manner to trail one directly behind the other, or at any desired degree of offset relation.

The object of my invention is to provide an improved draft mechanism of the character indicated that may be readily controlled in a simple and positive manner for the purpose described, and which is strong in construction and efficient in operation.

I attain these objects by means of mechanism, one embodiment of which is illustrated in the accompanying drawings, in which—

Figure 1 represents a top plan view of my invention as applied to the frame of a harvester; Fig. 2 is a side elevation of Fig. 1; Fig. 3 is a top plan view on a reduced scale of the mechanism and is designed to illustrate the manner of connecting a plurality of harvesters in tandem relation; Fig. 4 is an enlarged front elevation of part of the controlling mechanism along line A—B of Fig. 1; Fig. 5 shows a modified form of the invention having the draft member secured to the harvester frame directly; and Fig. 6 is in end elevation of Fig. 5.

The same reference numerals designate ike parts throughout the several views.

1 represents the grain platform of a harvester, including a front frame member 2 and a rear member 3; 4 represents the front member of the wheeled frame having the grainward end thereof secured to the member 2; 5 the rear member of the wheeled frame having the grainward end thereof secured to the rear member 3 of the grain platform.

6 represents a longitudinally arranged wheeled frame member at the stubbleward side thereof, and 7 a similar member spaced apart therefrom toward the grainward end; 8 represents the traction carrying wheel journaled in bearings carried by the frame members 6 and 7 in any of the well-known ways.

9 represents a bar having one end thereof pivotally connected with a fixed part of the wheeled frame by means of a bracket member $9^1$, and the opposite end with a bracket member 10 secured to the front member 2 of the grain platform by means of a bracket member $10^1$, and arranged substantially parallel with the front of the machine in a manner permitting a tilting movement of the harvester relative to the bar.

11 represents a draft tongue having the rear end thereof pivotally connected with the bracket $9^1$ in a manner permitting the tongue to swing laterally relative to the line of draft of the machine.

12 represents a bar having one end connected with the tongue, preferably coaxially with the pivotal connection thereof, and arranged at right angles therewith and having the opposite end thereof secured to the rear end of a brace member 13, the brace member extending forwardly and laterally and having the front end thereof secured to the draft tongue; the bar 12 and the brace member being, in effect, an integral part of the draft tongue, the function thereof being to increase the width of the rear end of the draft tongue grainward from the pivotal connection thereof with the bracket member $9^1$.

14 represents a bracket member secured to the wheeled frame member 7 intermediate the ends thereof by means of the bolts 15, and in substantially the same vertical plane as the axis of the traction wheel 8, and provided with a vertically arranged journal bearing 16 in which is journaled a stem 17, having secured to the upper end thereof a segmental worm wheel 18 that is operatively connected with the rear end of the brace member 13 by means of a link 19; the gear mechanism being shielded by means of a plate $19^1$.

20 represents a worm engaging with the wheel 18 and secured to the shaft 21 arranged in the direction of the line of draft of the machine, and journaled in laterally extending bearing members 22 integral with the bracket member 14, the rear end of the shaft 21 being operatively connected with the front end of a shaft 23 by means of a universal coupling mechanism 24; the rear end of shaft 23 being journaled in a bracket member 25 secured to the frame of the harvester and having secured thereto a bevel gear wheel 26.

27 represents a yoke member mounted upon the rear end of shaft 23 and in which is journaled the lower end of a vertically arranged shaft 28, having secured thereto a bevel pinion 29 engaging with the gear wheel 26, the upper end of said shaft being journaled in a bracket member 30 secured to the harvester frame and having integral therewith a crank member 31 within convenient reach of the operator, whereby the angular relation of the draft tongue and harvester may be readily controlled by a manipulation of the shafts 28 and 23, the worm 20, the segmental wheel 18 and the connecting link 19.

32 represents a supplemental wheeled frame member having the forward end thereof secured to the frame member 7 and extending rearward and grainward has the rear end thereof secured to the rear members 3 and 5 of the grain platform and wheeled frame, respectively, and 33 represents a similar member having the rear end thereof secured to the wheeled frame member 7 and extending forward and grainward has the forward end secured to the front members 2 and 4 of the grain platform and wheeled frame, respectively, the function of the members 32 and 33 being to resist a tendency of the draft force to distort the wheeled frame and the grain platform.

For the purpose of giving additional strength to the wheeled frame and grain platform of the harvester, I have provided a supplemental frame member 34 having the front end thereof secured to the wheeled frame member 7 in a vertical plane with the axis of the traction wheel through the bracket member 14, and extending rearward and grainward has the opposite end thereof secured to the rear frame member 3 of the grain platform by means of a bolt 35, and 36 represents an additional frame strengthening member preferably arranged parallel with the wheeled frame member 7 and having the front end thereof secured to the wheeled frame member 7 in a vertical plane with the axis of the traction wheel through bracket member 14, and the body portion thereof rigidly secured to the harvester frame by means of a clip member 37, the rear end of the member 36 being turned downward beyond the clip and provided with a vertically arranged opening that receives a bolt 38 whereby said frame member is rigidly secured to the stubbleward end of a draft bar 39, the opposite end of said bar being secured to the rear member 3 of the grain platform preferably by means of the bolt 35, and the body of the bar arranged concentric to the axis of the pivotal connection of the draft tongue with the bracket member $9^1$. The bar 39 may be secured to the wheeled frame and grain platform independent of the members 34 and 36, as shown in Figs. 5 and 6, if desired; the principal function of the bar 36 being to permit the bar 39 to be readily attached to various designs of harvester frames. In the construction shown in Figs. 5 and 6, the bar 39 is attached to the frame members 5 and 7 by means of the brackets $39^1$. 40 represents a draft clevis having the rear end thereof pivotally connected with the front end of the draft tongue 11 by means of a bolt 41, and 42 represents a sheave journaled upon a vertically arranged bolt 43 at the front end of the draft clevis whereby the draft tongue is operatively connected with the draft bar 39 in a manner to swing freely thereon as controlled by the tongue adjusting mechanism and the draft force applied to the machine.

In operation a plurality of harvesters or other implements are arranged in tandem relation, as illustrated by Fig. 3 of the drawings, and the draft tongue adjusting mechanism may be manipulated in a manner to cause the machines of the series to assume more or less of an offset relation relative to each other and with the source of traction power, or they may be arranged in a manner to trail in substantially the same path, as when being transported from field to field or upon the road, the connection of the front end of each draft tongue with the machine in front thereof being entirely independent of the connection of the rear end of the draft tongue of the forward machine; the connection of the front ends of the two supplemental frame members 34 and 36 being near the axis of the traction wheel, any liability of the wheel frame becoming distorted by reason of the draft being carried solely by the harvester frame is eliminated.

While I have in this application described certain embodiments of my invention, it is, of course, to be understood that the forms chosen are used for purposes of illustration, and that the invention itself may be embodied in other forms and modified without departing from its spirit.

What I claim as my invention and desire to secure by Letters Patent is:

1. In a tandem draft connection, a machine frame, a transversely disposed draft member at the rear thereof and at an angle to the line of draft, and a coöperating draft member freely slidable along said transverse member.

2. In a tandem draft connection, a machine frame having a transversely disposed arcuate draft member at the rear thereof and at an angle to the line of draft, the center of whose arc is located at one side of the median line of said frame.

3. In a tandem draft connection, a machine frame, a transversely disposed draft member rigidly connected to the rear thereof at its opposite ends and disposed at an angle to the line of draft, and a coöperating draft member trailing at the rear of said frame and freely slidable along said transverse member.

4. In a tandem draft connection, a machine frame, a draft tongue pivoted thereon and movable relative to the line of draft, and a coöperating arcuate draft member carried on said frame, the center of whose arc coincides substantially with the pivot of said tongue.

5. In a tandem draft connection, a frame, and an arcuate draft member spaced from the rear thereof and rigidly attached thereto at its ends, said draft member being disposed at an angle to the line of draft and having the center of its arc located at one side of the median line of said frame and in front of the latter.

6. In a tandem draft connection, a machine frame, a draft tongue pivoted thereon, an arcuate draft member carried on said frame, the center of whose arc coincides substantially with the pivot of said draft tongue, and a coöperating draft tongue operatively connected to said arcuate member and freely movable along the same.

7. In combination, a machine frame, a transverse draft member carried at the rear thereof, a second machine frame, a draft tongue pivoted thereon and connected to said transverse draft member, and means operable from said second frame for adjusting said draft tongue relative to the line of draft.

8. In combination, a machine frame, a transversely disposed draft member at the rear thereof, a second machine frame disposed at the rear of said first mentioned frame, and a coöperating draft tongue pivoted on said second frame and having its front end connected to and slidable along said transverse draft member.

9. In combination, a machine frame, a transverse draft member carried at the rear thereof, a second machine frame, and means operable from said second frame and operatively connected to said transverse draft member for varying the position of said second frame with respect to said first mentioned frame.

10. In combination, a machine frame, a transversely disposed draft member thereon, a second machine frame, a coöperating draft tongue pivoted on said second frame and connected to said transverse draft member, and means carried on said last mentioned frame and operable therefrom for adjusting said tongue longitudinally of said transverse draft member.

11. In combination, a machine frame, a transversely disposed draft member at the rear thereof, a second machine frame, a coöperating draft member pivoted thereon and connected to said transverse draft member, and means carried on one of said machine frames for adjusting the point of connection of said draft members.

12. In combination, a machine frame, a draft tongue pivoted at the front thereof, a transversely disposed draft member carried at the rear thereof, a second machine frame, a draft tongue pivoted at the front thereof and connected to said transverse draft member, and means for adjusting said draft tongue relative to the line of draft.

13. In combination, a machine frame, a draft tongue pivoted to the front thereof, a transversely disposed arcuate draft member carried at the rear thereof having the center of its arc coinciding substantially with the pivot of said draft tongue, a second machine frame, and a draft tongue pivoted thereon operatively connected to said arcuate draft member and slidable along the same.

14. In combination, a machine frame, a draft tongue pivoted to the front thereof, a transversely disposed arcuate draft member carried at the rear thereof having the center of its arc coinciding substantially with the pivot of said draft tongue, a second machine frame, a draft tongue pivoted thereon operatively connected to said arcuate draft member and slidable along the same, and means carried on said frames for adjusting said draft tongues relative to the line of draft.

15. In combination, a machine frame, a transverse draft member carried thereon, a second machine frame trailing at the rear of said first mentioned frame and in offset relation with respect thereto, and a draft tongue carried on said second frame and connected to said transverse draft member, the point of connection between the tongue and transverse member being automatically determined by the degree of offset relation of said frames.

16. In combination, a machine frame, a transversely disposed draft member carried at the rear thereof, a second machine frame disposed in offset relation with respect to said first frame, a draft tongue pivoted on said second frame and connected to said transverse draft member, and means carried on said last mentioned frame for adjusting said draft member relative to the line of draft to maintain a predetermined offset relation of said machine frames during angular movement of said first mentioned frame.

17. In a tandem draft connection, a machine frame, a draft member pivoted to the front thereof and movable relative to the line of draft, a plurality of rearwardly extending diverging members rigidly connected to said frame, and a transversely disposed member rigidly connecting the rear ends of said diverging members.

18. In a tandem draft connection, a machine frame, a draft member pivoted to the front thereof and movable relatively to the line of draft, a plurality of rearwardly extending diverging braces rigidly connected to said frame, and an arcuate member protruding beyond the rear of said frame rigidly connecting the ends of said diverging braces and disposed at an angle to the line of draft.

19. In a tandem draft connection, a frame, an arcuate draft member at the rear thereof and rigidly attached thereto at its ends, said draft member being disposed at an angle to the line of draft, and a coöperating draft member freely movable between the ends of said arcuate draft member and protruding rearwardly therefrom.

20. In a tandem draft connection, a machine frame, a draft member pivoted at the front end thereof and movable relative to the line of draft, adjusting mechanism therefor carried by said frame, and a second transversely disposed draft member rigidly attached to said frame and protruding at an angle to the rear thereof.

21. In a tandem draft connection, a machine frame, a draft member pivotally connected to the front end thereof and movable with respect to the line of draft, adjusting mechanism therefor carried by said frame intermediate its ends, rearwardly extending braces rigidly connected to said adjusting mechanism, and a transversely disposed brace rigidly connecting the rear ends of said braces and itself rigidly attached to said frame.

22. In a tandem draft connection, a machine frame, a draft tongue pivotally connected thereto, a coöperating draft member rigidly secured to the opposite side of said frame and disposed transversely to the line of draft, a trailing frame, and means thereon operatively connected to and freely movable longitudinally of said draft member as said tongue is moved about its pivot.

23. In a tandem draft connection, a machine frame, a draft tongue pivotally connected thereto, and a coöperating draft member rigidly secured to the opposite side of said frame in rear and at one side of the pivot of said tongue, said draft member having an elongated draft surface disposed transversely to the line of draft.

24. In a tandem draft connection, a machine frame, a draft tongue pivotally connected thereto, a draft member rigidly secured to the opposite side of said frame and disposed transversely to the line of draft, and a second draft tongue connected with said draft member and freely movable longitudinally thereof while said frame is moving forward in the field.

25. In a tandem draft connection, a machine frame, a draft tongue having one end connected with one side thereof, means for varying the angular relation of said frame and tongue relative to the line of draft, and a coöperating draft member rigidly secured to the opposite side of said frame and disposed transversely to the line of draft and at an acute angle with respect to a transverse line through said frame.

26. In a tandem draft connection, a machine frame, a draft tongue having the rear end thereof pivotally connected with one side of said frame, means mounted upon said frame in rear of the axis of said draft tongue and operative to control the angular relation between said tongue and frame relative to the line of draft, and a coöperating draft member rigidly secured to the opposite side of said frame at one side of said tongue pivot, said member being disposed transversely to the line of draft.

27. In a tandem draft connection, a machine frame, a draft tongue provided with a relatively wide rear end, having one side thereof pivotally connected with said frame, means mounted upon said frame in rear of the axis of said tongue operatively connected with the opposite side of the rear end of said draft tongue, said means being operative in a manner to control the angular relation between said tongue and frame relative to the line of draft, and a draft member rigidly secured to the opposite side of said frame and disposed transversely to the line of draft.

28. In a tandem draft connection, a machine frame, a draft tongue having pivotal connection with said frame, a bar having one end thereof secured to the rear end of said tongue and extending laterally therefrom, a second bar having its rear end secured to the opposite end of said laterally extending bar and inclined laterally forward and having its opposite end secured to said tongue, means mounted upon said frame in rear of the axis of said tongue and operatively connected with one of said bars, said means being operative in a manner to control the angular relation between said tongue and frame relative to the line of draft, and a draft member rigidly secured to the opposite side of said frame and disposed transversely to the line of draft.

29. In a tandem draft connection, a machine frame, a horizontally arranged draft bar disposed parallel with the front side of said frame and pivotally connected therewith in a manner permitting a tilting movement of said frame relative to said bar, a draft tongue pivotally connected with said bar in a manner permitting it to swing laterally relative to the line of draft, means mounted upon said frame in rear of the axis of said tongue, said means being connected with said tongue and operative to control the angular relation between said frame and tongue relative to the line of draft, and a draft member rigidly secured to the opposite side of said frame and disposed transversely to the line of draft.

30. In a tandem draft connection, a machine frame, a traction wheel mounted in said frame, a draft tongue pivotally connected with the front side of said frame and adapted to swing laterally relative thereto, means for controlling a swinging movement of said tongue, said means being secured to said frame near the axis of said wheel, and a draft member rigidly secured to the rear side of said frame and disposed transversely to the line of draft.

31. In a tandem draft connection, a machine frame including front and rear members and spaced members having their opposite ends secured to said front and rear members, a traction wheel mounted between said spaced members, a draft tongue pivotally connected with the front side of said frame and adapted to swing laterally relative thereto, a bracket member secured to one of said spaced frame members near the axis of said wheel, means carried by said bracket and operative to control a swinging movement of said tongue, said bracket member being connected with the rear frame member by one or more supplemental frame members, and a draft member rigidly secured to the rear side of said frame and disposed transversely to the line of draft.

32. In a tandem draft connection, a machine frame, a draft tongue pivotally connected thereto, a draft member rigidly secured to the opposite side of said frame and disposed transversely of the line of draft, and a second draft tongue having a clevis member pivotally connected with the front end thereof, said clevis member connecting said second tongue with said draft member and being freely slidable longitudinally thereof.

33. In a tandem draft connection, a machine frame, a draft member rigidly secured thereto and disposed transversely of the line of draft, a draft tongue, a clevis member connected with the front end of said tongue and connecting the same to said draft member, and a roller carried on said clevis member engageable with said draft member when said tongue is moved relatively to said draft member.

34. In combination, a plurality of machine frames disposed one in front of the other, a draft tongue pivoted to the rear frame and having its front end disposed adjacent the rear end of the forward frame, a transverse draft member carried on the rear end of said forward frame, a sheave carried on said tongue and engaging said transverse member, and means on one of said frames for adjusting said tongue and sheave relative to said transverse member.

35. In a tandem draft connection, a machine frame, a front draft connection therefor, and a coöperating transversely disposed draft member carried on said frame in rear of said front draft connection, said transverse draft member being disposed at an angle to the line of draft and at one side of a longitudinally extending line passing through said draft connection.

36. In a tandem draft connection, a machine frame, a draft tongue provided with a relatively wide rear end having one side thereof pivotally connected with said frame, and means mounted upon said frame in rear of the axis of said tongue operatively connected with the opposite side of the rear end thereof, said means being operative in a manner to control the angular relation between said tongue and frame relative to the line of draft.

37. In a tandem draft connection, a machine frame including front and rear sill members and a longitudinally disposed member connecting the same, a bracket carried on said longitudinal member, a longitudinally disposed worm journaled in said bracket, a horizontally disposed toothed segment journaled in said bracket and engaging said worm, a longitudinally disposed link pivotally connected to said segment and protruding forward beyond said front sill member, and a tongue member pivoted to said frame at a point adjacent the front sill member and operatively connected to said link at a point at one side of its pivot.

In testimony whereof I affix my signature, in the presence of two witnesses.

CHARLES PEARSON.

Witnesses:
RAY PATTISON,
R. M. MARTIN.